April 28, 1942.    H. F. IRVING ET AL    2,281,355
PROCESS FOR PRODUCING RUBBER HYDROCHLORIDE AND LIKE PRODUCTS
Filed May 1, 1939
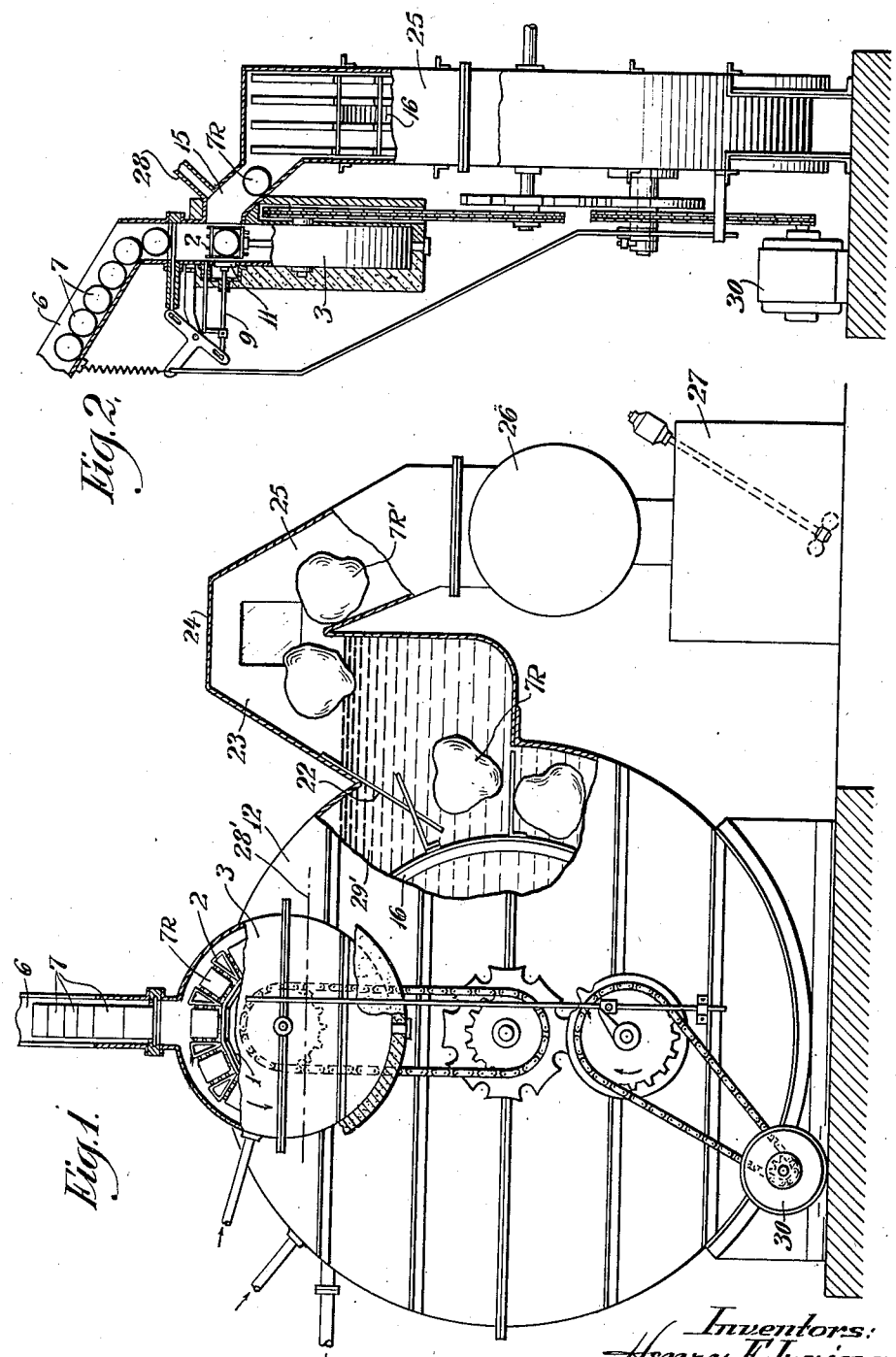
Inventors:
Henry F. Irving
Floyd E. Williams.
By Jabel, Carlson, Gritzbaugh & Wells
Attorneys Patented Apr. 28, 1942

2,281,355

UNITED STATES PATENT OFFICE 2,281,355

PROCESS FOR PRODUCING RUBBER HYDROCHLORIDE AND LIKE PRODUCTS

Henry F. Irving and Floyd E. Williams, Gary, Ind., assignors to Marbon Corporation, Gary, Ind., a corporation of Delaware Application May 1, 1939, Serial No. 271,064

3 Claims. (Cl. 260—771)

This application is a continuation in part of our co-pending application Serial No. 219,670, filed July 16, 1938, which describes process and apparatus for treating solid material with liquids but claims solely the apparatus.

This invention relates to a method of isolating solid reaction products from fluid reagents and to the direct recovery of the fluid reagents.

More particularly the invention relates to a method of isolating rubber hydrochloride and recovering hydrogen chloride from rubber hydrochloride obtained by reacting a solid mass of rubber with hydrogen chloride.

In accordance with the invention, a solid mass of material such as rubber or the like is reacted with a fluid reagent such as gaseous or liquefied hydrogen chloride, chlorine, hydrogen sulfide or the like, and the reaction product so obtained is immersed in a liquid medium incapable of absorbing the fluid reagent such as, for example, a saturated aqueous solution of the fluid reagent which is at a temperature higher than that of the reaction mass. In this manner heat is transferred into the solid reaction mass by the liquid medium causing the fluid reagent, generally in gaseous form, to be released from the reaction mass without being absorbed by the liquid medium. The fluid reagent so released may then be directly recovered.

The invention is particularly applicable to the removal of fluid reagents from rubber derivatives such as rubber hydrochloride or chlorinated rubber since these materials so tenaciously hold their fluid reagents that direct removal by evacuation is slow and incomplete, and when heat is used in an attempt to increase the speed of removal, decomposition of the reaction product is apt to result. In the removal of hydrogen chloride from rubber hydrochloride obtained from reaction of sheet rubber or corrugated rubber bundles such as described in our Patent 2,139,922, the process of this invention is more commercially suitable than any processes, so far as we know, which have heretofore been practiced.

Other objects and advantages of the invention will become apparent as the following detailed description progresses, reference being had to the accompanying drawing in which:

Fig. 1 is a front elevation partly in section of an apparatus adapted for carrying out the process of the invention.

Fig. 2 is a side elevation on line 2—2 of Fig. 1, also partly in section.

Referring to the drawing, the process of the invention will be illustrated by its application to the method of making amorphous rubber hydrochloride, it being understood that the example simply illustrates one embodiment which has given satisfactory results and is not intended to restrict the invention thereto.

The process of making rubber hydrochloride in the apparatus illustrated in the drawing is as follows:

The cylindrical chamber 3 is filled with liquefied anhydrous hydrogen chloride to about the level 28' as shown in Fig. 1. The cylindrical chamber 12 is filled with a saturated solution of hydrogen chloride in water to about the level indicated at 29' in Fig. 1. The wheels 1 and 16 are then rotated by motor means 30 shown. Rolls of rubber 7 consisting of corrugated sheets of pale crepe are placed in the conduit 6 and drop down into the receptacles 2 of the wheel 1 when the valve 29 opens on every revolution of the wheel 1. Likewise as the wheel rotates, the bundles 7 are immersed in the liquefied hydrogen chloride and react with it, producing bundles of amorphous rubber hydrochloride 7R. As these bundles 7R emerge from the liquefied hydrogen chloride they are pushed out of the receptacle 2 by the motor operated pusher rod 9 and disc 11 into the conduit 15 where they fall into the pockets in the wheel 16 as this wheel 16 rotates.

The rotation of the wheel 16 carries the bundles 7R down into the fully concentrated hydrochloric acid (saturated aqueous solution of hydrogen chloride). As the bundles 7R travel through this hydrochloric acid they are raised in temperature, due to heat transfer between the bundles and the hydrochloric acid. This heating of the bundles of rubber hydrochloride vaporizes the excess hydrogen chloride from the bundles of rubber hydrochloride, and the gaseous hydrogen chloride so formed passes through the saturated solution of hydrochloric acid and is then recovered through exit 28. On emerging from the hydrochloric acid the bundles 7R' contact the rod 22 and are directed up into the conduit 23, thence down through the conduit 25 into the shredder 26. The bundles are ground in the shredder 26 into granulated rubber hydrochloride. The ground rubber hydrochloride is removed from the shredder and washed with water in the mixing tank 27.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

We claim:

1. The improvement in the method of preparing rubber hydrochloride which comprises reacting a bundle of rubber with liquefied hydrogen chloride to form a bundle of rubber hydrochloride, and immersing said bundle of rubber hydrochloride in an aqueous liquid medium saturated with hydrogen chloride and at a temperature substantially above the temperature of said bundle of rubber hydrochloride whereby heat is transferred into said mass of rubber hydrochloride and hydrogen chloride is released from said mass without being absorbed by said liquid, and recovering said hydrogen chloride.

2. The improvement in the method of preparing rubber hydrochloride which comprises successively immersing a plurality of bundles of spaced sheet rubber in a bath of liquefied hydrogen chloride to form bundles of rubber hydrochloride, successively removing said bundles of rubber hydrochloride from said liquefied hydrogen chloride and successively immersing said bundles in a saturated aqueous solution of hydrogen chloride at a temperature substantially above the temperature of said bundle of rubber hydrochloride whereby heat is transferred into said mass of rubber hydrochloride and hydrogen chloride is released from said mass without being absorbed by said liquid, and successively removing said bundle of rubber hydrochloride substantially free from hydrogen chloride.

3. In the method of isolating rubber hydrochloride and recovering hydrogen chloride from a mass of rubber reacted with hydrogen chloride, the steps which comprise immersing said reacted rubber mass in a saturated aqueous solution of hydrogen chloride at a temperature substantially above the temperature of the mass whereby heat is transferred into said mass, and hydrogen chloride is released from said mass for direct recovery.

HENRY F. IRVING.
FLOYD E. WILLIAMS.

CERTIFICATE OF CORRECTION.

Patent No. 2,281,355.  April 28, 1942.

HENRY F. IRVING, ET AL.

It is hereby certified that error appears in the printed specification of the above numbered patent requiring correction as follows: In the grant, line 1, name of first inventor, for "HARRY F. IRVING" read --HENRY F. IRVING--; and that the said Letters Patent should be read with this correction therein that the same may conform to the record of the case in the Patent Office.

Signed and sealed this 9th day of June, A. D. 1942.

(Seal)

Henry Van Arsdale,
Acting Commissioner of Patents.